March 11, 1924. 1,486,582
H. A. HOUSE
LINK BELTING
Filed Oct. 17, 1922
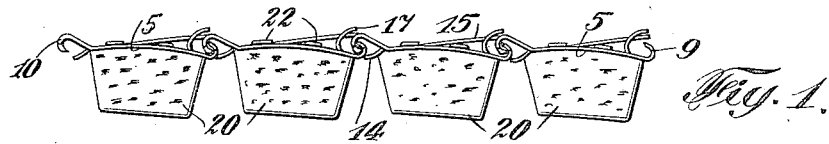
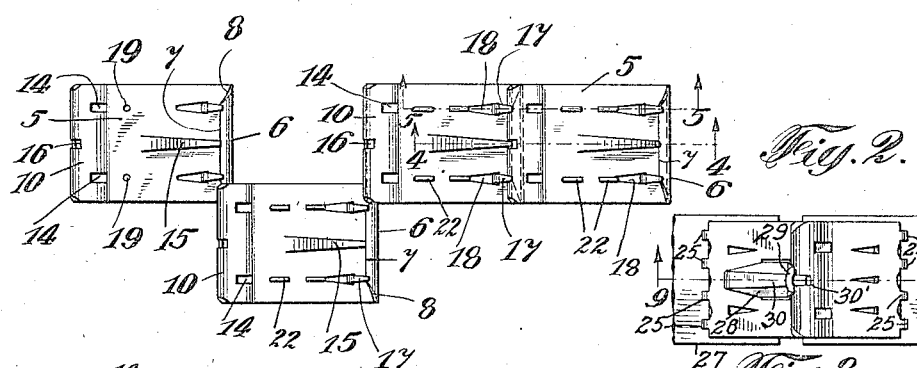
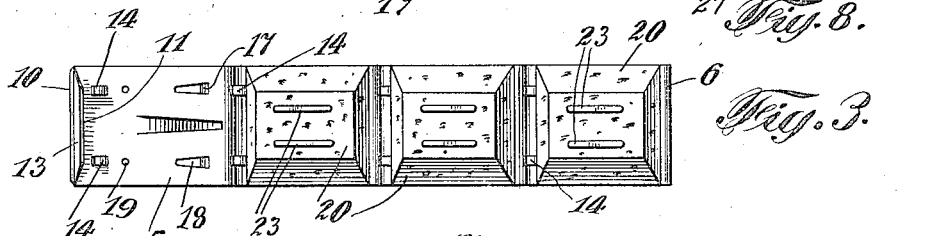
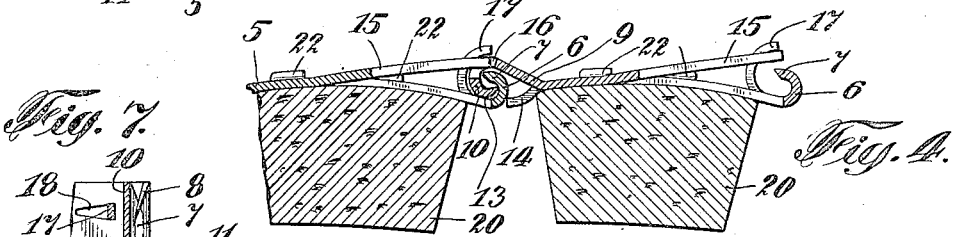
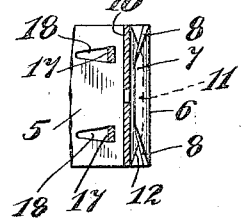
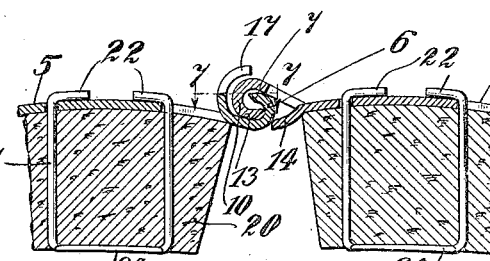
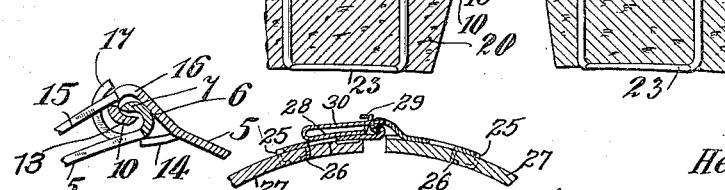
INVENTOR
Henry A. House
BY his ATTORNEY Patented Mar. 11, 1924.

1,486,582

UNITED STATES PATENT OFFICE.

HENRY A. HOUSE, OF BRIDGEPORT, CONNECTICUT.

LINK BELTING.

Application filed October 17, 1922. Serial No. 595,036.

*To all whom it may concern:*

Be it known that I, HENRY A. HOUSE, a citizen of the United States, and a resident of Bridgeport, county of Fairfield, and State of Connecticut, have invented certain new and useful Improvements in Link Belting, of which the following is a specification.

This invention relates to link belting and more particularly to flexible sheet metal belting such for instance as that shown in Patent No. 1,205,210, granted to me Nov. 21, 1916 and which is preferably composed of a multiplicity of composite belt units of the character disclosed in my pending application for patent Ser. No. 549,382, filed April 4, 1922.

It is one of the important objects of the invention to provide certain improvements in the flexible connection between the sheet metal elements of adjacent belt units so as to better equalize the stresses upon the interlocked parts of said sheet metal elements and thereby minimize the tendency of distortion of such parts incident to vibration, longitudinal strain or pull, or other causes.

In one embodiment of the invention I may provide the sheet metal elements of such construction that they can be conveniently employed for the purpose of fastening or connecting together the ends of a leather belt.

The invention also has for another important object to provide an improved form of the flexible interlocked parts of the sheet metal elements whereby they may be more easily connected or disconnected. In addition, the sheet metal element of each belt unit is provided at one end with stop lugs adapted to abut against the end of an adjacent unit and limit the relative flexing movement of the belt units in one direction so as to prevent contacting engagement of the friction members carried by the sheet metal elements with each other.

An additional object is to provide an improved construction of the interlocking ends of the sheet metal elements and a manually releasable latch means therefor whereby said ends may be readily moved into properly interlocked relation and in such movement will automatically engage and displace the latch means from its normal position.

It is also a further object to provide a simple and easily applied means for securely fixing the friction members upon one side of the sheet metal elements.

With the above and other objects in view, the invention consists in the improved link belting and in the form, construction and relative arrangement of the several parts of the composite belt units as will be hereinafter more fully described, illustrated in the accompanying drawings and subsequently incorporated in the subjoined claims.

In the drawing wherein I have illustrated one satisfactory and practical embodiment of the invention and in which similar reference characters designate corresponding parts throughout the several views:

Figure 1 is a side elevation of a section of a belt composed of my improved composite belt units;

Figure 2 is a top plan view thereof illustrating the manner in which any one of the belt units may be removed or replaced in the belt structure;

Figure 3 is a bottom plan view;

Figures 4 and 5 are detail longitudinal sections taken respectively on the lines 4—4 and 5—5 of Fig. 2, and showing the adjacent belt units when disposed at the limit of their relative movement in one direction.

Figure 6 is a view similar to Fig. 5 showing the relative positions of adjacent belt units at the limit of their movement in the opposite direction;

Figure 7 is a detail horizontal section taken on the line 7—7 of Figure 5;

Figure 8 is a detail plan view showing a modified embodiment of the interlocking sheet metal elements employed as a connection between the ends of a leather drive belt; and Figure 9 is a section taken on the line 9—9 of Fig. 8.

In my pending application for patent above identified, I have shown and described a composite belt unit consisting of a sheet metal plate having means at its ends for flexibly connecting the same to the plates of adjacent belt units and upon one side of which a pulley engaging member of friction material is fixed. In the present illustrated embodiment of my invention I provide a similar sheet metal plate 5 slightly curved in its longitudinal dimension. At one of its ends the plate 5 is formed with an inwardly curved lip 6 terminating in a knife edge 7. This lip at its opposite ends is obliquely cut from the side edges of the plate 5 to the knife edge 7 as indicated at 8.

The opposite end portion of the plate 5 is angularly offset as at 9 and projects from the same side of the plate as the lip 6. This offset portion 9 of the plate is formed with an inwardly curved bearing member 10 which likewise terminates in a knife edge 11. The ends of said bearing member are also obliquely cut as at 12 from the side edges of the plate to the knife edge 11 in a similar manner to the lip 6. The underside of the bearing member 10 adjacent to the knife edge 11 is provided with a flattened or plane portion 13 extending across the entire length of said bearing member.

Spaced lugs 14 are struck from the angularly offset portion 9 of the plate and project beyond the opposite side face thereof towards the bearing member 10, the free ends of said lugs being spaced from the knife edge 11 of said bearing member.

The sheet metal plate 5 also has a latch tongue 15 struck from its central portion, the free end of said tongue being adapted for engagement in a slot 16 centrally formed in the bearing member 10 when the adjacent links are properly connected so as to prevent the relative sliding movement of bearing member 10 and the lip 6 of the flexibly connected links. At each side of the latch tongue 15 a lug 17 is struck from the body of the plate and projects from the same side thereof as said latch tongue. These lugs are preferably curved and spaced from the lip 11 so that they will extend over the curved bearing member 10 of the connected link. These lugs serve as guides in the connection of the links to each other and also afford a protection for the flexibly connected ends of the metal plates so that they will not be seriously bent or distorted should the belt be roughly handled or heavy objects be placed thereon. The provision of these lugs 17 affords openings 18 in each of the plates and in line with said openings and adjacent the opposite end of the plate additional openings 19 are provided.

To the inner concave face of the sheet metal plate, a pulley engaging member 20 of cork or other suitable frictional material is secured by means of the wire staple 21, said staple having parallel vertical legs connected by the intermediate portion of the wire and said legs having their terminal portions disposed through the openings 18 and 19 and clinched down upon the convex surface of the plate 5, as shown at 22. The intermediate portion of the wire staple 23 is preferably flattened and counter-sunk in the face of the friction member 20, as indicated at 23.

In connecting the composite belt units above described to each other, a nail or other suitable implement is first inserted beneath the latch tongue 15 to force the free end of said tongue outwardly from its normal position. The other link is then positioned out of alignment with the first link and the curved bearing member 10 is disposed with its knife edge in contact with the inner concave face of the curved lip 6. The bearing member is then shifted transversely of the link, the knife edge 7 of the lip 6 engaging the inner concave face of the bearing member, until the side edges of the link plates 5 are in substantial alignment. Upon then withdrawing the nail from beneath the latch tongue 5 this tongue will return to its normal position, the free end thereof engaging in the slot 16 of the bearing member 10 to thus prevent relative separating movement of the connected ends of the link plates. It is to be observed that in this new construction, the knife edges 7 and 11 have substantially constant bearing contact with the concave surfaces of the member 10 and the lip 6 respectively. Thus strains or stresses incident to longitudinal pull upon the link units are equally borne by the flexibly interlocked ends of the plates 5 which serves to minimize the liability of distortion of these connected end portions of the plates.

As seen in Figures 4 and 5 of the drawing, when the adjacent belt units are flexed in one direction, such movement is limited by contact of the flattened or plane surface portion 13 of the bearing member 10 upon the face of the plate 5 of the adjacent connected unit. Relative movement of the belt units in the opposite direction is also limited by the contacting engagement of the ends of the lugs 14 with the lip 6 of the adjacent unit, thus preventing contact of the opposed ends of the adjacent friction members 20 with each other.

It has been found in practice that by obliquely cutting the ends of the coacting bearing parts 6 and 10 of the sheet metal plates, the connection of such bearing parts with each other may be much more easily and quickly made than was possible in my prior construction. The decreased length of the knife edges 7 and 11 which is incident thereto also results in a free pivotal or rocking contact of said bearing parts with each other and therefore obviates frictional binding engagement of such parts which would retard the free relative flexing movement of the link plates. The provision of the obliquely inclined edge portions 12, enable the plates to be connected by a semi-automatic interlocking action. In other words when the two plates are arranged as seen at the left of Figure 2 of the drawing and shifted relatively to each other, the inclined edge 12 rides against the end of the tongue 15 and forces said tongue outwardly so that it will engage upon the surface of the bearing part 10 and finally snap into the notch or recess 16 thereof. Thus it is only necessary to manually force the spring tongue outwardly from its normal position in disconnecting the interlocked plates.

In Figs. 8 and 9 of the drawings I have shown a slightly modified construction of the flexibly interlocked sheet metal plates in which the complementary interlocking means is substantially the same as that above described. In this case, however, each plate is provided at the opposite end from its interlocking portion with a series of angularly bent prongs 25. An additional series of prongs 26 disposed in staggered relation to prongs 25 are struck from the body of the plate and project in the same direction from said plate as the prongs 25. These prongs 25 and 26 are adapted to be forced through the leather belt 27 and their ends securely clinched thereon as shown in Figure 9 of the drawing. Owing to the fact that the sheet metal plates in this embodiment of the invention are relatively short, the resilient locking tongue cannot be struck from the body of the plate as it would not be of sufficient length to enable said tongue to be sprung from its locking position owing to the fact that the metal plates are hardened. Therefore, I provide a locking tongue which is formed from a separate resilient piece of sheet metal suitably fixed at one of its ends to one of the metal plates, the fixed portion 28 of said resilient plate lying closely upon the surface of the connecting plate. This fixed portion of the plate at its extremity is formed with an upwardly projecting slotted keeper lug 29. The other end portion of the plate is reduced in diameter and longitudinally tapered to provide the resilient locking tongue 30 which is normally disposed in substantially parallel relation to the fixed end portion 28 of the plate and has its extremity extending through the slot in the keeper lug 29 and projecting beyond said lug for engagement in the central slot 30' which is formed in the curved bearing portion on the end of the other connecting plate.

When it is desired to disconnect the ends of the belt, the end portion 30 of the resilient locking plate is sprung outwardly so as to disengage the locking tongue from the slot 30' such outward movement of the tongue being limited by the keeper lug 29. Thus this locking tongue will not be distorted from its normal position and possibly bent to such an extent so that it would not properly engage in the slot 30'. It will thus be seen that I have provided a very simple construction of the interlocking plates which can be advantageously used as a belt fastener or connector and is capable of being very easily and quickly applied to the belt ends.

From the foregoing description considered in connection with the accompanying drawing, the construction, manner of operation and several advantages of the present invention will be fully understood. While the improvements which I have made in my prior constructions are of a simple nature, they have nevertheless been found to be quite desirable and to appreciably increase the durability and practical utility of flexible belts of this character. It is of course, apparent that my present invention has the same capabilities as the devices shown in my prior patent and pending application, and that a flexible driving belt may be produced from these composite units of any desired length or width.

While I have herein referred to a certain preferred specific form of my present improvements, it is obvious that the same desirable results might be obtained by means of other alternative constructions. It is accordingly to be understood that I reserve the privilege of resorting to all such legitimate changes in the form, construction and relative arrangment of the several parts as may be fairly embodied within the spirit and scope of the invention as claimed.

I claim:—

1. A connector comprising two metal plates having complementary interlocking means at one of their ends constructed to provide a bearing portion between the plates and one of said plates having a stop lug opposed to the interlocked end of the other plate and engaging the outer and lower faces thereof to prevent the disconnection of the interlocking portions from each other.

2. A belt connector comprising two rigid sheet metal plates having complementary interlocking means at one of their ends constructed to permit of a lateral relative rocking movement of the plates and one of said plates provided with stop lugs opposed to the interlocked end of the other plate and engaging the outer and lower faces thereof to prevent the disconnection of the interlocking portions from each other.

3. A belt connector comprising two rigid sheet metal plates having complementary interlocking means at one of their ends, stop lugs projected from one of said plates and disposed in opposed relation to the interlocked end of the other plate to prevent the accidental disconnection of said plates, said interlocked end portions of the plates also having coacting means limiting the relative flexing movement of said plates, and means for rigidly securing each of said plates to a body portion of a flexible driving belt.

4. A belt connector comprising two rigid sheet metal plates having complementary interlocking means at one of their ends, the coacting interlocked portions of the plates constructed to permit of a relative lateral rocking movement of said plates, releasable means carried by one of said plates, for preventing accidental disconnection of their interlocked ends while permitting of such relative lateral rocking movement, stop lugs projected from one of said plates and opposed to the interlocked end of the other plate to prevent relative longitudinal shifting movement of said plates, and means for securing each of said plates to the body portion of a driving belt.

5. A connector comprising a plate provided with an angularly offset portion terminating in an inwardly curved bearing member having a bearing edge, a second plate having a curved lip terminating in a bearing edge adapted to be flexibly interlocked with the bearing member, and one of said plates provided with a stop lug opposed to the interlocked end of the other plate and engaging the outer and lower faces thereof to prevent the disconnection of the interlocking portions from each other.

6. A belt unit comprising a plate provided with an angularly offset end portion terminating in an inwardly curved bearing member having a bearing edge, said plate at its other end having a curved lip projecting from the same side of said plate as said angularly offset portion and also terminating in a bearing edge, the bearing member and lip of adjacent belt units adapted to be flexibly interlocked with each other with said bearing edges in constant bearing contact against the inner concave faces of the lip and bearing member respectively, said bearing member and lip being obliquely inclined from the side edges of the plate to the bearing edges to facilitate the flexible interlocking engagement of the parts with each other.

7. A belt unit comprising a plate provided with an angularly offset end portion terminating in an inwardly curved bearing member having a bearing edge, said plate at its other end having a curved lip projecting from the same side of said plate as said angularly offset portion and also terminating in a bearing edge, the bearing member and lip of adjacent belt units adapted to be flexibly interlocked with each other with said bearing edges in constant bearing contact against the inner concave faces of the lip and bearing member respectively, said bearing member and lip being obliquely inclined from the side edges of the plate to the bearing edges to facilitate the flexible interlocking engagement of the parts with each other, each of the plates having curved lugs struck therefrom in opposed relation to the lip and adapted to extend over the bearing member of the connected unit and constituting guiding means for said bearing member in the connection of the belt units.

8. A belt unit comprising a plate provided with an angularly offset end portion terminating in an inwardly curved bearing member having a bearing edge, said plate at its other end having a curved lip projecting from the same side of said plate as said angularly offset portion and also terminating in a bearing edge, the bearing member and lip of adjacent belt units adapted to be flexibly interlocked with each other with said bearing edges in constant bearing contact against the inner concave faces of the lip and bearing member respectively, each plate also having stop lugs struck from the angularly offset portion thereof and adapted to coact with the lip of an adjacent connected plate to limit the flexing movement of the connected belt units in one direction with respect to each other.

9. A belt unit comprising a plate provided with an angularly offset end portion terminating in an inwardly curved bearing member having a bearing edge, said plate at its other end having a curved lip projecting from the same side of said plate as said angularly offset portion and also terminating in a bearing edge, the bearing member and lip of adjacent belt units adapted to be flexibly interlocked with each other with said bearing edges in constant bearing contact against the inner concave faces of the lip and bearing member respectively, the bearing member of said plate being provided adjacent to its bearing edge with a flattened or plane portion to coact with the plate of an adjacent connected unit and limit the flexing movement of said connected units in one direction with respect to each other.

10. A composite bent unit comprising a plate having its opposite ends provided with means for flexible interlocking connection with complementary means on the ends of adjacent belt units, guard lugs struck from the body of said plate adapted to extend over the flexibly interlocked end portions of the link plates, a friction member engaged against one side of the link plate, and means rigidly securing said member to the link plate and extending through the openings in said plate resulting from the formation of said guard lugs.

11. A belt connector comprising two rigid sheet metal plates having co-engaging flexibly interlocking portions, one of said interlocking portions having an obliquely inclined edge, means for releasably retaining said plates in interlocked relation including a spring tongue adapted to be engaged by said inclined edge and automatically displaced from its normal position to permit of the relative movement of said plates into properly connected relation.

In testimony that I claim the foregoing as my invention, I have signed my name hereunder.

HENRY A. HOUSE.